Patented Oct. 10, 1944

2,359,935

UNITED STATES PATENT OFFICE 2,359,935

COMPOSITION OF MATTER

Walter Nudenberg, Chicago, Ill., and Lewis W. Butz, Beltsville, Md., assignors to The United States of America, as represented by Claude R. Wickard, Secretary of Agriculture, and his successors in office No Drawing. Application April 18, 1944, Serial No. 531,664

4 Claims. (Cl. 260—586)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to certain new compositions of matter which are useful as intermediates in the synthesis of polycyclic compounds, for example, the steroids.

We have found that the angle-methyloctalone, cis-10-methyl-7-naphthiten-1-one (cis-9-methyl-8-keto-2-octalin), can be prepared by a Diels-Alder reaction from 1-methylcyclohexen-6-one and butadiene. Many Diels-Alder reactions have been carried out with butadiene, but it has been thought for a long time that methylcyclohexenones did not react. The reaction was carried out using a large excess (4-5 equivalents) of the ketone in either a sealed tube or in a glass-lined rocking autoclave. In a typical run 55.5 g. of 1-methylcyclohexen-6-one, boiling point 62–66° C. at 12-13 mm., was placed in the rocking autoclave with some small pieces of glass tubing and the air was displaced with nitrogen. A few crystals of hydroquinone and then 9 g. of butadiene, which had been cooled in dry ice, were added. The apparatus was closed and shaken while heating at 200° C. for 40 hours. After cooling and opening, the contents of the reaction vessel was distilled at 12-13 mm. 3.8 g. of cis-10-methyl-7-naphthiten-1-one, boiling at 76–77° C. at 1.5 mm., was obtained. Since 13 g. of the methylcyclohexenone was converted, the yield was 20 percent. On redistillation the methyloctalone boiled at 67° C. at 0.5 mm. and had a refractive index, $n_D$, at 20° C., of 1.5042.

The new ketone was characterized by the preparation of a semicarbazone. The semicarbazone, recrystallized from dilute ethanol, had a melting point of 224.8° to 225° C. A solution of 0.155 g. (0.95 millimole) of the ketone adduct dissolved in 5 ml. of ethanol absorbed 1.88 millimoles of hydrogen when reduced in the presence of 20 mg. of Adams catalyst.

Cis - 10 - methyl - 7 - naphthiten-1-one (cis-9-methyl-8-keto-2-octalin) is represented by the formula:

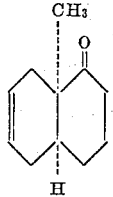

We have also found that a series of useful derivatives can be prepared from the octalone described above. The preparation of these derivatives is illustrated by the following examples:

EXAMPLE I 5,10 - cis-1-ethynyl-10-methyl-7-naphthiten-1-ol

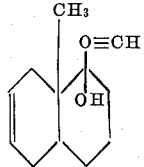

A liquid ammonia solution of sodium acetylide was prepared from 2.5 g. of sodium and 300 ml. of a solution of acetylene in liquid ammonia. To the stirred sodium acetylide solution, 12.15 g. of cis-10-methyl-7-naphthiten-1-one in 50 ml. of ether was added during fifteen minutes. Stirring was continued for four hours and the ammonia was allowed to evaporate over night. Ether, benzene, and ice were added to the resulting brown oil, and the alkaline solution thus formed was neutralized with acetic acid. Extraction with ether, washing the ether with sodium bicarbonate solution, and then with saturated sodium chloride solution, followed by drying with sodium sulfate and removal of the ether, gave a residue which was distilled at 0.5 mm. 12.3 g. (87 percent yield) of 5,10-cis-1-ethynyl-10-methyl-7-naphthiten-1-ol, boiling at 93–94° C., at 0.5 mm. and having a refractive index, $n_D$ at 20° C., of 1.5260, was obtained. A methyl alcohol solution of the ethynyl carbinol with ammoniacal methanolic silver nitrate gave a pinkish white precipitate of the silver acetylide.

EXAMPLE II

*5,10-cis-10-methyl-1-vinyl-7-naphthiten-1-ol*

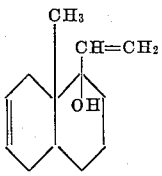

5,10-cis-1-ethynyl-10-methyl-7-naphthiten-1-ol, 9.5 g. in 100 ml. of ethanol, was hydrogenated in the presence of 0.8 g. of palladium on calcium carbonate catalyst. Hydrogenation was discontinued after one mole had been absorbed. This required six minutes. Norite was added, and the mixture was boiled gently, and then filtered. Fractional distillation of the residue remaining after removal of the ethanol gave 8.82 g. (92 percent yield) of 5,10-cis-10-methyl-1-vinyl-7-naphthiten-1-ol.

EXAMPLE III

*Cis-10-methyl-1-vinyl-1,7-naphthitadiene*

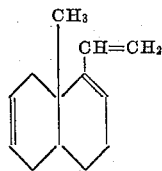

8 g. of 5,10-cis-10-methyl-1-vinyl-7-naphthiten-1-ol and 1.1 g. of pyridine were added with shaking to 3.61 g. of phosphorus tribromide which had been cooled by an ice bath. The mixture was heated at 40–50° C. for thirty minutes. Filtration through a sintered glass funnel, followed by successive washing with water and saturated sodium chloride, and then drying with sodium sulfate, gave a residue which was distilled as follows: (1) 0.53 g., $b_{0.47}$ 79–89° C.; (2) 1.65 g., $b_{0.4}$ 89–92° C.; (3) 3.14 g., $b.$ 77–103° C. at 0.8–1.4 mm. (elimination of hydrogen bromide); (4) 1.57 g., $b_{0.5}$ 103–112° C. Fractions (1), (2) and (3) were combined and redistilled to give 2.53 g. of cis-10-methyl-1-vinyl-1,7-naphthitadiene, $b_{0.5}$ 67–69° C., $n_D^{20}$ 1.5284, maximum absorption in ultra-violet at 2380 A., 9400 in hexane at 2380 A., and 10,000 in ethanol.

0.37 millimole of the hydrocarbon absorbed 26.2 ml. of hydrogen at standard temperature and pressure as compared with an adsorption calculated for three double bonds of 26.75 ml. The hydrocarbon when heated with one-half equivalent of p-naphthoquinone in a sealed tube at 110° C. for forty-five minutes gave a yellow crystalline adduct, M. P. 191.8–192.8° C.

Having thus described our invention, we claim:

1. Cis-10-methyl-7-naphthiten-1-one (cis-9-methyl-8-keto-2-octalin).
2. 5,10-cis-1-ethynyl-10-methyl-7-naphthiten-1-ol.
3. 5,10-cis-10-methyl-1-vinyl-7-naphthiten-1-ol.
4. Cis-10-methyl-1-vinyl-1,7-naphthitadiene.

WALTER NUDENBERG.
LEWIS W. BUTZ.